United States Patent
Anchi et al.

(10) Patent No.: US 11,023,161 B1
(45) Date of Patent: Jun. 1, 2021

(54) HOST DEVICE WITH MULTI-PATH LAYER IMPLEMENTING EFFICIENT LOAD BALANCING FOR ACTIVE-ACTIVE CONFIGURATION

(71) Applicant: EMC IP Holding Company LLC, Hopkinton, MA (US)

(72) Inventors: Amit Pundalik Anchi, Bangalore (IN); Vinay G. Rao, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/694,291

(22) Filed: Nov. 25, 2019

(51) Int. Cl.
  *G06F 3/06* (2006.01)
(52) U.S. Cl.
  CPC .......... *G06F 3/0655* (2013.01); *G06F 3/0604* (2013.01); *G06F 3/067* (2013.01)
(58) Field of Classification Search
  CPC ....... G06F 3/0655; G06F 3/067; G06F 3/0604
  See application file for complete search history.

(56) References Cited

U.S. PATENT DOCUMENTS

| | | | |
|---|---|---|---|
| 6,567,397 B1 | 5/2003 | Campana et al. | |
| 6,687,746 B1 | 2/2004 | Shuster et al. | |
| 6,697,875 B1 | 2/2004 | Wilson | |
| 7,454,437 B1 | 11/2008 | Lavallee et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,904,681 B1 | 3/2011 | Bappe et al. | |
| 7,925,872 B2 | 4/2011 | Lai et al. | |
| 8,060,710 B1 * | 11/2011 | Don | G06F 3/0617 711/161 |
| 8,825,919 B1 | 9/2014 | Lim et al. | |
| 8,874,746 B1 | 10/2014 | Gonzalez | |
| 8,972,656 B1 * | 3/2015 | Armangau | G06F 3/0635 711/114 |
| 9,026,694 B1 | 5/2015 | Davidson et al. | |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Michelle T Bechtold
(74) *Attorney, Agent, or Firm* — Ryan, Mason & Lewis, LLP

(57) ABSTRACT

An apparatus comprises a host device that includes a multi-path input-output (MPIO) driver configured to control delivery of input-output (IO) operations from the host device to first and second storage systems over selected paths through a network. The MPIO driver is further configured to obtain a copy command associated with at least one of the IO operations, to identify a plurality of paths shared between source and destination logical storage devices of the copy command, to select a particular path from the identified paths, and to send the copy command to one of the first and second storage systems over the selected path. The first and second storage systems in some embodiments are arranged in an active-active configuration relative to one another. A given one of the source and destination logical storage devices may comprise a paired logical device established in accordance with the active-active configuration of the first and second storage systems.

20 Claims, 3 Drawing Sheets

(56) References Cited

U.S. PATENT DOCUMENTS

| | | | |
|---|---|---|---|
| 9,400,611 | B1 | 7/2016 | Raizen |
| 9,594,780 | B1 | 3/2017 | Esposito et al. |
| 9,778,852 | B1 | 10/2017 | Marshak et al. |
| 10,353,714 | B1 | 7/2019 | Gokam et al. |
| 10,439,878 | B1 | 10/2019 | Tah et al. |
| 10,474,367 | B1 | 11/2019 | Mallick et al. |
| 10,476,960 | B1 | 11/2019 | Rao et al. |
| 2004/0010563 | A1 | 1/2004 | Forte et al. |
| 2004/0243776 | A1* | 12/2004 | Matsui ............... G06F 3/0607 711/162 |
| 2006/0277383 | A1 | 12/2006 | Hayden et al. |
| 2008/0043973 | A1 | 2/2008 | Lai et al. |
| 2009/0125679 | A1* | 5/2009 | Takeuchi ............ G06F 11/2007 711/114 |
| 2011/0197027 | A1 | 8/2011 | Balasubramanian et al. |
| 2011/0296230 | A1 | 12/2011 | Chen et al. |
| 2015/0222705 | A1 | 8/2015 | Stephens |
| 2016/0092136 | A1 | 3/2016 | Balakrishnan et al. |
| 2016/0117113 | A1 | 4/2016 | Li et al. |
| 2016/0335003 | A1 | 11/2016 | Ahmed et al. |
| 2018/0189635 | A1 | 7/2018 | Olarig et al. |
| 2019/0095299 | A1 | 3/2019 | Liu et al. |
| 2019/0108888 | A1 | 4/2019 | Sarkar et al. |

OTHER PUBLICATIONS

NVM Express, "NVM Express, Revision 1.3," NVM Express, May 1, 2017, 282 pages.

Vmware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

U.S. Appl. No. 16/142,274 filed in the name of Sanjib Mallick et al. on Sep. 26, 2018 and entitled "Host Device with Multi-Path Layer Implementing Automatic Standby Setting for Active-Active Configuration."

U.S. Appl. No. 15/795,653 filed in the name of Maneesh Pusalkar et al. on Oct. 27, 2017 and entitled "Storage System with Network-Wide Configurable Device Names."

* cited by examiner

HOST DEVICE WITH MULTI-PATH LAYER IMPLEMENTING EFFICIENT LOAD BALANCING FOR ACTIVE-ACTIVE CONFIGURATION

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations for delivery to storage ports of the storage system. The storage ports are typically limited in number and each has limited resources for handling TO operations received from the host devices. Different ones of the host devices can run different applications with varying workloads and associated TO patterns. Such host devices also generate additional TO operations in performing various data services such as replication and migration so as to meet business continuity requirements. Conventional host device multi-pathing arrangements are in some situations unable to deal adequately with these and other variabilities in TO processing behavior. For example, some existing multi-path layers implement a static path selection approach that does not produce optimal results in all situations.

SUMMARY

Illustrative embodiments configure a multi-path layer of one or more host devices to include efficient load balancing functionality for paths utilized to communicate with multiple storage systems, such as first and second storage systems arranged in an active-active configuration. The paths illustratively comprise paths through a storage area network (SAN) or other type of network over which one or more host devices communicate with a storage array or other type of storage system.

The multi-path layer illustratively comprises at least one multi-path input-output (MPIO) driver configured to process IO operations of at least one host device that communicates with multiple distinct storage arrays or other types of storage systems. The multi-path layer in such arrangements can be configured to provide particularly efficient load balancing of extended copy (XCOPY) commands and other types of copy commands.

For example, the load balancing provided by an MPIO driver in some embodiments substantially reduces the likelihood that one or more such copy commands will be rejected by one storage system in an active-active configuration with another storage system, thereby avoiding copy command failures. Such copy command failures might otherwise cause host migration software to fall back to usage of a host data copy mechanism between source and destination logical storage devices of the copy command, thereby necessitating consumption of valuable host CPU cycles. Alternatively, such copy command failures might lead to an excessive number of retries, which can unduly delay the logical storage device copying process and thereby adversely impact migration or replication.

These and other drawbacks of conventional practice are avoided in illustrative embodiments. As a result, such embodiments can provide improved performance in processing of IO operations. Moreover, these embodiments can facilitate data replication or migration across multiple storage systems using an active-active configuration, thereby providing more efficient protection against failures.

In one embodiment, an apparatus comprises a host device that includes an MPIO driver configured to control delivery of IO operations from the host device to first and second storage systems over selected paths through a network. The MPIO driver is further configured to obtain a copy command associated with at least one of the IO operations, to identify a plurality of paths shared between source and destination logical storage devices of the copy command, to select a particular path from the identified paths, and to send the copy command to one of the first and second storage systems over the selected path.

The first and second storage systems in some embodiments are arranged in an active-active configuration relative to one another, although other arrangements are possible in other embodiments. A given one of the source and destination logical storage devices may comprise a paired logical device established in accordance with the active-active configuration of the first and second storage systems. Such a paired logical device is illustratively identified by the MPIO driver as a single logical device but has separate corresponding logical devices on the respective first and second storage systems.

The paths in some embodiments are associated with respective initiator-target pairs, with the initiators being implemented on the host device and the targets being implemented on the first and second storage systems. For example, the initiators of the initiator-target pairs illustratively comprise respective host bus adaptors (HBAs) of the host device and the targets of the initiator-target pairs illustratively comprise respective storage array ports of the first and second storage systems.

In some embodiments, identifying a plurality of paths that are shared between source and destination logical storage devices comprises, for example, determining at least respective identifiers of the source and destination logical storage devices of the copy command, illustratively by decoding at least a portion of a command payload of the copy command. Additional or alternative information, such as other types of storage array source and target identifiers, can be used in conjunction with a shared path identification process. A first data structure of the host device is accessed based at least in part on the identifier of the source logical storage device, and a second data structure of the host device is accessed based at least in part on the identifier of the destination logical storage device. The plurality of paths that are shared between source and destination logical storage devices are illustratively identified utilizing path information obtained from the first and second data structures.

For example, the first data structure illustratively comprises a first object specifying a first set of paths between the host device and at least one of the first and second storage systems, and the second data structure illustratively comprises a second object specifying a second set of paths between the host device and at least one of the first and second storage systems.

Identifying the plurality of paths utilizing path information obtained from the first and second data structures in such an embodiment can more particularly comprise identifying the plurality of paths as the intersection of the first and second sets of paths.

Additionally or alternatively, at least one of the first object and the second object comprises a federated object that specifies paths to both the first and the second storage systems for a paired logical device that is identified by the MPIO driver as a single logical device but has separate corresponding logical devices on the respective first and second storage systems.

The copy command illustratively comprises a Small Computer System Interface (SCSI) command of a particular type, such as an XCOPY command of a standard SCSI command set. A wide variety of other types of copy commands can be similarly subject to efficient load balancing by an MPIO driver in other embodiments.

A given such copy command in some embodiments comprises a command payload, with the command payload comprising a plurality of descriptors, including at least a first descriptor identifying the source logical storage device and a second descriptor identifying the destination logical storage device.

In some embodiments, operation of a load balancing algorithm of the MPIO driver is modified based at least in part on the identified paths.

Additionally or alternatively, selecting a particular path from the identified paths illustratively comprises limiting a load balancing algorithm of the MPIO driver to consideration of only the identified paths in selecting the particular path for sending the copy command to one of the first and second storage systems.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
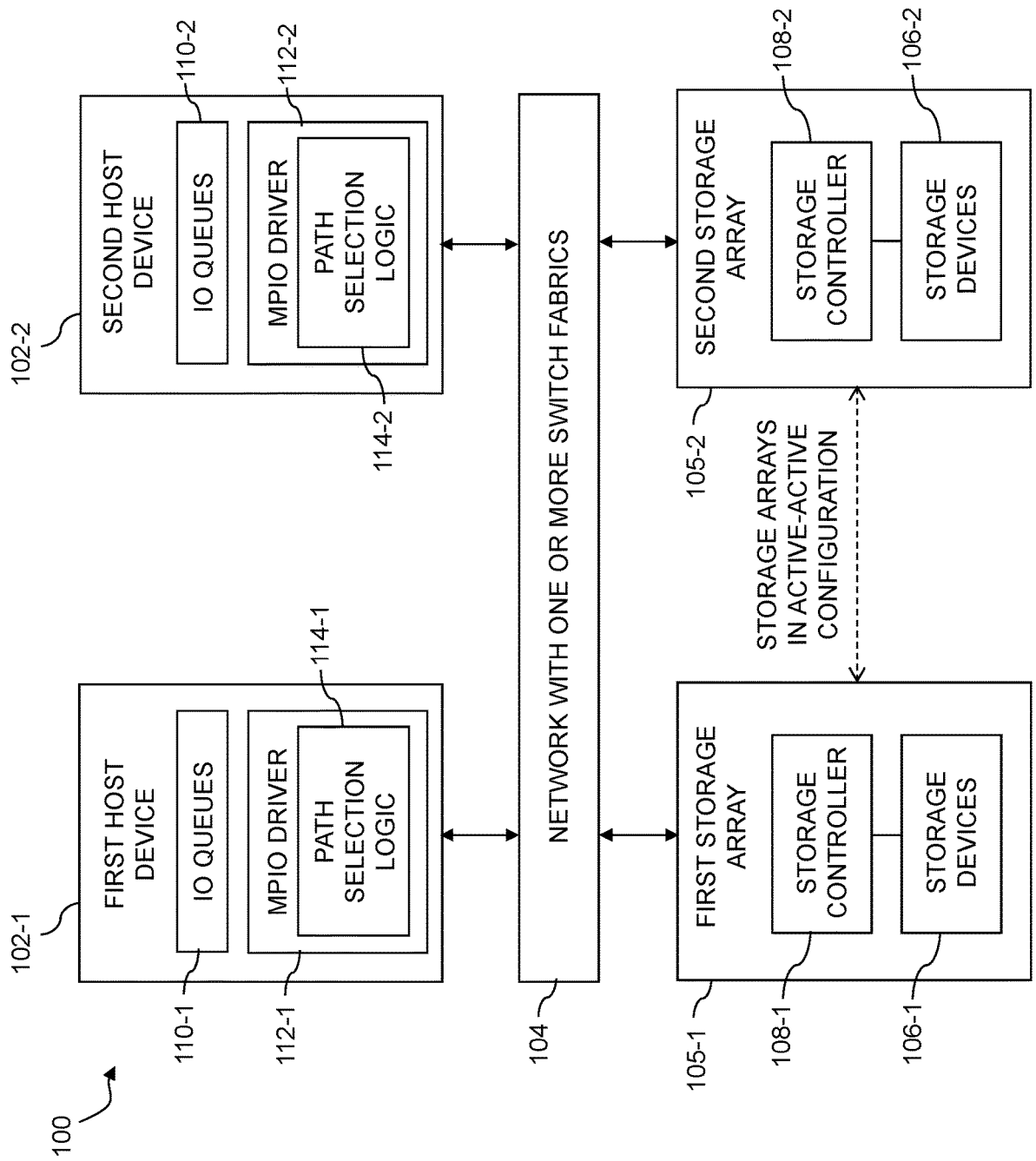
FIG. 1 is a block diagram of an information processing system configured with functionality for efficient load balancing of copy commands utilizing a multi-path layer of a host device in an illustrative embodiment.

FIG. 1 shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises one or more switch fabrics. The host devices 102 communicate over the network 104 via the one or more switch fabrics with at least first and second storage arrays 105-1 and 105-2, collectively referred to herein as storage arrays 105. For example, the network 104 illustratively comprises at least one storage area network (SAN) and the one or more switch fabrics illustratively comprise respective distinct switch fabrics of a set of multiple switch fabrics interconnecting the host devices 102 with the storage arrays 105 over the one or more SANs. Each of the one or more switch fabrics in some embodiments is associated with a different SAN.

The system 100 may be configured such that the first host device 102-1 communicates with the first storage array 105-1 over a first switch fabric and communicates with the second storage array 105-2 over a second switch fabric. Similarly, the second host device 102-2 can communicate with the first storage array 105-1 over the first switch fabric and communicate with the second storage array 105-2 over the second switch fabric. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102 and two storage arrays 105 are shown in the figure, this is by way of illustrative example only, and other embodiments can include additional instances of such elements. It is also possible that alternative embodiments may include only a single host device.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The storage arrays 105-1 and 105-2 comprise respective sets of storage devices 106-1 and 106-2, collectively referred to herein as storage devices 106, coupled to respective storage controllers 108-1 and 108-2, collectively referred to herein as storage controllers 108.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, at least one of the storage arrays 105 illustratively comprises one or more VNX®, VMAX®, Unity™ or PowerMax™ storage arrays, commercially available from Dell EMC of Hopkinton, Mass.

As another example, one or both of the storage arrays 105 may comprise respective clustered storage systems, each including a plurality of storage nodes interconnected by one or more networks. An example of a clustered storage system of this type is an XtremIO™ storage array from Dell EMC, illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 105 in some embodiments may be implemented as part of cloud infrastructure in the form of a cloud-based system such as an Amazon Web Services (AWS) system. Other examples of cloud-based systems that can be used to provide at least portions of the storage arrays 105 and possibly other portions of system 100 include Google Cloud Platform (GCP) and Microsoft Azure.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104.

Such commands in some embodiments more particularly comprise SCSI commands, although other types of commands may be used in other embodiments, including commands that are part of a standard command set, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by the host device 102-1 to one of the storage arrays 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes. Logical storage devices are also referred to herein as simply "logical devices."

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage arrays 105-1 and 105-2 are assumed to be arranged in an active-active configuration in the FIG. 1 embodiment. In such an arrangement, data stored in one of the storage arrays 105 is replicated to the other one of the storage arrays 105 utilizing a replication process. Such data replication across the multiple storage arrays 105 can be used to facilitate failure recovery in the system 100. One of the storage arrays 105 may therefore operate as a production storage array relative to the other storage array which operates as a backup or recovery storage array. Examples of active-active configurations include "metro" or "stretched" high availability storage array configurations. The term "active-active configuration" as used herein is therefore intended to be broadly construed.

In the present embodiment, it is assumed that the storage arrays 105-1 and 105-2 participate in a replication process that more particularly comprises a synchronous replication process. In accordance with the synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

The synchronous replication process is therefore configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for concurrent operation of such modes and separate operation of the individual modes. It is also possible in some embodiments that a given replication process implemented using storage arrays 105 may comprise only synchronous replication or only asynchronous replication, instead of multiple distinct replication modes.

It is assumed that the storage controllers 108 of the respective storage arrays 105 each comprise replication control logic and a snapshot generator. The replication control logic controls performance of the above-noted synchronous replication process. The snapshot generator is used to generate snapshots of one or more storage volumes that are subject to synchronous replication in conjunction with active-active storage clustering.

The snapshots generated by the storage controllers 108 of the storage arrays 105 illustratively comprise respective point-in-time (PIT) replicas of the storage volumes. Multiple snapshots generated over time for a given storage volume can collectively comprise a "snapshot group" and information characterizing those snapshots in some embodiments is stored in the form of a snapshot tree or other arrangement of one or more data structures suitable for storing information characterizing a snapshot group. In some embodiments, a snapshot tree for a storage volume is configured to add a new node each time a new snapshot is generated for that storage volume. The term "snapshot" as used herein is intended to be broadly construed, and in some embodiments may encompass a complete PIT replica or other types of information characterizing the state of a given storage volume at a particular time.

A given storage volume designated for synchronous replication between storage arrays 105 in the system 100 illustratively comprises a set of one or more LUNs or other storage volumes of the storage arrays 105. Each such LUN or other storage volume is assumed to comprise at least a portion of a physical storage space of one or more of the storage devices 106 of the corresponding storage arrays 105.

The host devices 102 comprise respective sets of IO queues 110-1 and 110-2, and respective MPIO drivers 112-1 and 112-2. The MPIO drivers 112 collectively comprise a multi-path layer of the host devices 102. The multi-path layer provides automated path selection functionality using respective instances of path selection logic 114-1 and 114-2 implemented within the MPIO drivers 112.

The MPIO drivers 112 may comprise, for example, otherwise conventional MPIO drivers, such as PowerPath® drivers from Dell EMC, suitably modified in the manner disclosed herein to provide functionality for efficient load balancing. Other types of MPIO drivers from other driver vendors may be suitably modified to incorporate functionality for efficient load balancing as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Other types of sources of IO operations may be present in a given implementation of system 100.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of one of the storage arrays 105. The corresponding logical device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing, MPIO driver 112-1 of host device 102-1 is configured to control delivery of IO operations from the host device 102-1 to the first and second storage arrays 105 over selected paths through the network 104.

The MPIO driver 112-1 in implementing at least portions of efficient load balancing functionality of host device 102-1 for XCOPY commands and other types of copy commands is further configured in illustrative embodiments to obtain a copy command associated with at least one of the IO operations, to identify a plurality of paths that are shared between source and destination logical storage devices of the copy command, to select a particular path from the identified paths, and to send the copy command to one of the first and second storage arrays over the selected path.

For example, in some embodiments, the source logical device comprises a non-paired or "local only" logical device and the destination logical device comprises a paired logical device. Such a paired logical device is illustratively established in accordance with the active-active configuration of the first and second storage arrays, and is identified by the MPIO driver 112-1 as a single logical device but has separate corresponding logical devices on the respective first and second storage arrays. Migration from a non-paired logical device to a paired logical device can be achieved using one or more XCOPY commands or other types of copy commands of the type noted above. Such migration can be implemented, for example, in order to achieve a high availability arrangement for the data of the migrated logical device, with the migrated logical device being accessible on both of the storage arrays 105. Numerous other migration, replication or other types of data movement scenarios can be configured to utilize efficient load balancing techniques as disclosed herein.

In some embodiments, identifying a plurality of paths that are shared between source and destination logical storage devices comprises determining at least respective identifiers of the source and destination logical storage devices of the copy command, accessing a first data structure of the host device based at least in part on the identifier of the source logical storage device, accessing a second data structure of the host device based at least in part on the identifier of the destination logical storage device, and identifying the plurality of paths utilizing path information obtained from the first and second data structures.

Such data structures may more particularly include what are referred to herein as storage array objects that include "inventories" of storage devices of their corresponding storage arrays, with such objects being maintained by the MPIO driver 112-1. For example, the first data structure illustratively comprises a first object specifying a first set of paths between the host device 102-1 and at least one of the first and second storage arrays 105, and the second data structure comprises a second object specifying a second set of paths between the host device 102-1 and at least one of the first and second storage arrays 105.

Identifying the plurality of paths utilizing path information obtained from the first and second data structures in such an embodiment illustratively comprises identifying the plurality of paths as the intersection of the first and second sets of paths.

In some embodiments, at least one of the first object and the second object comprises a federated object that specifies paths to both the first and the second storage arrays for a paired logical device that is identified by the MPIO driver 112-1 as a single logical device but has separate corresponding logical devices on the respective first and second storage arrays 105.

The source and destination logical devices are determined in some embodiments by decoding at least a portion of a command payload of the copy command. For example, the copy command may comprise a SCSI XCOPY command that includes a command payload, with the command payload comprising a plurality of descriptors, including at least a first descriptor identifying the source logical storage device and a second descriptor identifying the destination logical storage device. Numerous other command and command payload formats may be used. Also, various types of additional or alternative information, such as other types of storage array source and target identifiers, can be used in conjunction with a shared path identification process as disclosed herein.

The MPIO driver 112-1 illustratively modifies the operation of a load balancing algorithm that it uses in path selection based at least in part on the identified paths that are shared between the source and destination logical devices.

For example, selecting a particular path from the identified paths illustratively comprises limiting a load balancing algorithm of the MPIO driver 112-1 to consideration of only the identified paths in selecting the particular path for sending the copy command to one of the first and second storage arrays.

The above-described functions associated with efficient load balancing functionality of the MPIO driver 112-1 are illustratively carried out at least in part under the control of its path selection logic 114-1. For example, the path selection logic 114-1 is illustratively configured to control performance of the steps of the flow diagram to be described below in conjunction with FIG. 2.

It is assumed that the other MPIO driver 112-2 is configured in a manner similar to that described above and elsewhere herein for the first MPIO driver 112-1. The MPIO driver 112-2 is therefore similarly configured to select IO operations from its corresponding one of the sets of IO queues 110 for delivery to the storage arrays 105 over the network 104 and to perform the disclosed efficient load balancing functionality. Accordingly, efficient load balancing functionality described above in the context of the first MPIO driver 112-1 is assumed to be similarly performed by the other MPIO driver 112-2.

The MPIO drivers 112 may be otherwise configured utilizing well-known MPIO functionality such as that described in "Dell EMC SC Series Storage and Microsoft Multipath I/O," Dell EMC, CML1004, July 2018, which is incorporated by reference herein. Such conventional MPIO functionality is suitably modified in illustrative embodiments disclosed herein to support efficient load balancing.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 206, and is suitable for use in the system 100 but is more generally applicable to other types of systems comprising one or more host devices and first and second storage systems. The first and second storage systems in this embodiment are assumed to comprise respective first and second storage arrays arranged in an active-active configuration, with each storage array comprising a plurality of storage devices. The storage devices of the first and second storage arrays are assumed to include logical storage devices such as LUNs or other logical storage volumes.

Figure 2:
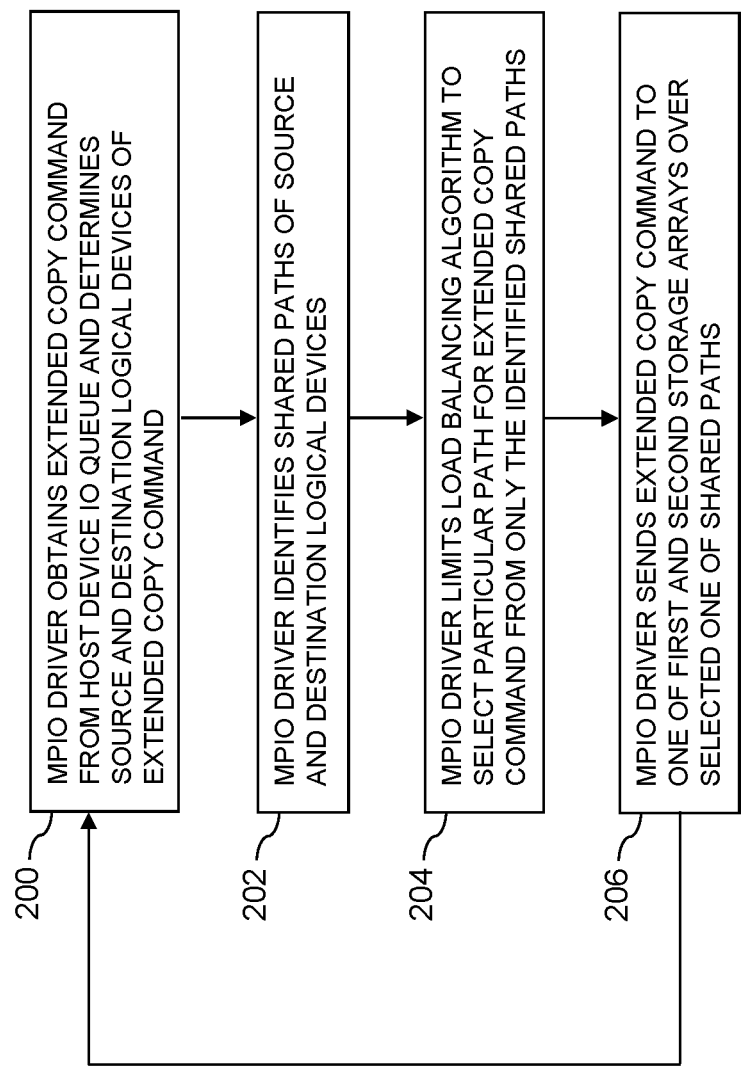
FIG. 2 is a flow diagram of a process for efficient load balancing of copy commands utilizing a multi-path layer of a host device in an illustrative embodiment.

The steps of the FIG. 2 process are illustratively performed primarily by or under the control of an MPIO driver of a given host device, such as the MPIO driver 112-1 of the first host device 102-1 of system 100, although other arrangements of system components can perform at least portions of one or more of the steps in other embodiments. The functionality of the FIG. 2 process is illustratively performed in conjunction with a load balancing algorithm executed by the path selection logic 114-1.

In step 200, the MPIO driver in the first host device obtains an extended copy command from the host device IO queue and determines source and destination logical devices of the extended copy command. As indicated previously, the extended copy command in such an embodiment illustratively comprises a SCSI XCOPY command, although other types of SCSI or non-SCSI commands could be used. The source and destination logical devices are illustratively determined by decoding at least portions of a command payload of the extended copy command, such as one or more descriptors of the command payload. Other techniques can be used to determine the source and destination logical devices in other embodiments.

In step 202, the MPIO driver identifies shared paths of source and destination logical devices. At least some of the paths from the first host device to the storage arrays may be determined using an initial path discovery scan performed in conjunction with booting of the host device. It is assumed for the description of this embodiment that the host device has discovered a plurality of paths to the storage arrays, and further that at least one storage device of at least one of the storage arrays is visible to the host device on each of the paths.

A given such path discovery scan can be repeated responsive to one or more detected path changes or under other specified conditions. For example, a storage administrator or other user may perform zoning and/or masking changes to the storage array that result in at least one new path becoming available to the host device.

In step 204, the MPIO driver limits a load balancing algorithm to select a particular path for the extended copy command from only the identified shared paths.

In step 206, the MPIO driver sends the extended copy command to one of the first and second storage arrays over the selected one of shared paths. The process then returns to step 200 to process another extended copy command.

Different instances of the FIG. 2 process can execute at least in part in parallel with one another for different extended copy commands.

Also, multiple additional instances of the FIG. 2 process are assumed to be performed in respective ones of one or more additional host devices that share multiple storage arrays arranged in an active-active configuration.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and efficient load balancing functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different efficient load balancing arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
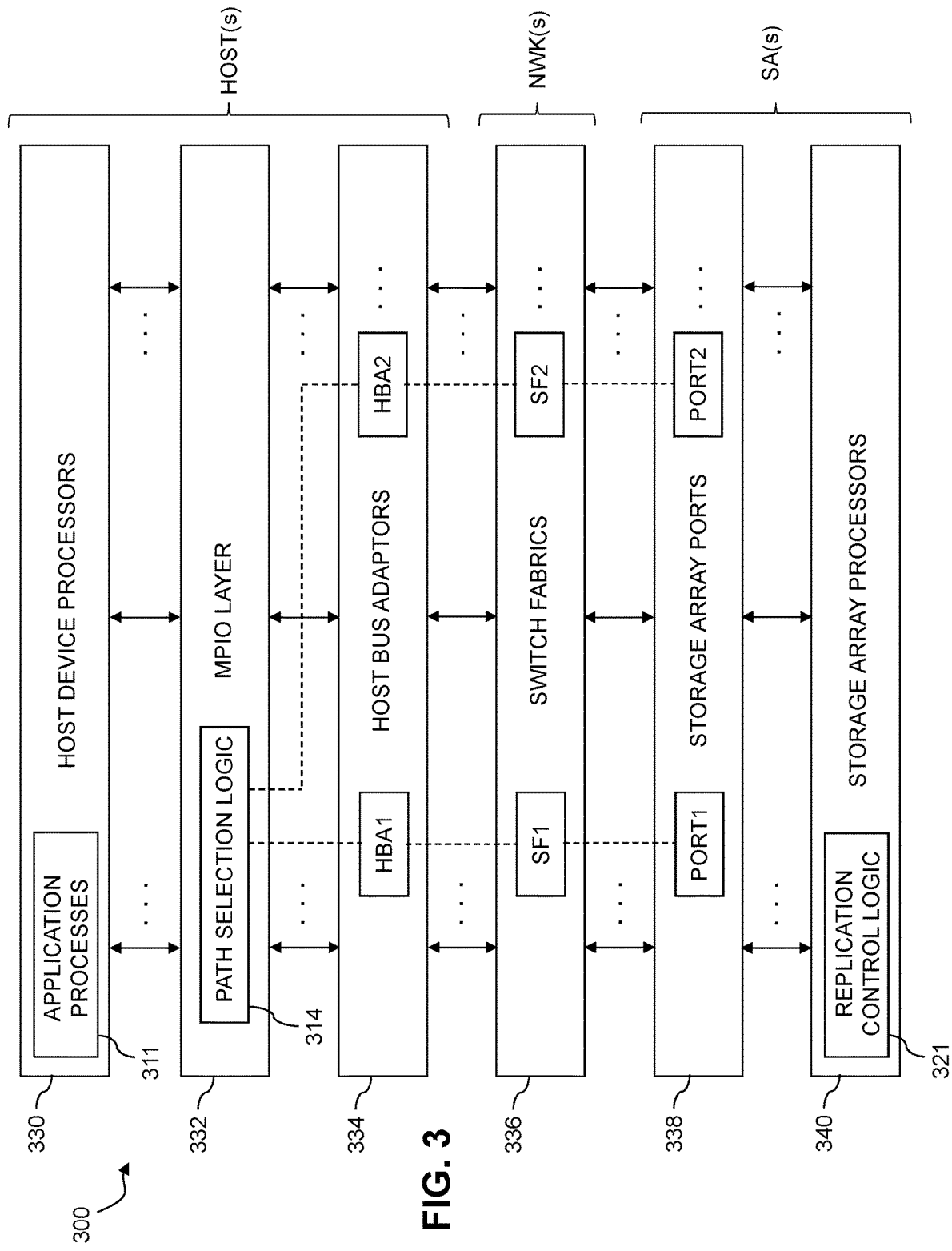
FIG. 3 is a block diagram showing multiple layers of a layered system architecture that includes a multi-path layer with efficient load balancing functionality in an illustrative embodiment.

Referring now to FIG. 3, another illustrative embodiment is shown. In this embodiment, an information processing system 300 comprises application processes 311, path selection logic 314 and replication control logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. As illustrated in the figure, the host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements efficient load balancing of copy commands, such as SCSI XCOPY commands. The copy commands are illustratively generated by one or more of the application processes 311 running in one or more host device processors of the host device processor layer 330. The efficient load balancing functionality in this embodiment is assumed to be controlled at least in part by path selection logic 314 of the MPIO layer 332, although other arrangements are possible.

The MPIO layer 332 is an example of what is also referred to herein as a multi-path layer, and comprises one or more MPIO drivers implemented in respective host devices. Each such MPIO driver illustratively comprises an instance of path selection logic 314 configured to implement functionality for efficient load balancing of copy commands substantially as previously described. Additional or alternative layers and path selection logic arrangements can be used in other embodiments.

The replication control logic 321 implemented in the storage array processor layer 340 controls the active-active configuration of a given pair of storage arrays. For example, the replication control logic 321 can include functionality for carrying out a synchronous replication process between first and second storage arrays in the active-active configuration. It is also possible in some embodiments that the replication control logic 321 can include multiple distinct replication control logic instances for respective ones of a plurality of storage arrays of the system 300. Although not explicitly shown in the figure, additional replication control logic is illustratively implemented in the host device processor layer 330, or elsewhere in the system 300, such as in the MPIO layer 332.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338. In selecting the paths for copy commands, the path selection logic 314 ensures that such paths are selected for a given copy command from a limited set of paths, namely, paths that are shared by the source and destination logical devices of that copy command, as described elsewhere herein. For example, the path selection logic 314 can limit a load balancing algorithm normally used to select the paths for delivery of IO operations such that it considers only the identified shared paths of source and destination logical devices of a copy command when selecting a path for delivery of that copy command to one of the storage arrays of the system 300.

Accordingly, in this embodiment the host devices of system 300 through their respective MPIO drivers and respective instances of path selection logic 314 provide functionality for efficient load balancing of copy commands, possibly with involvement of other host device or system components.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

As mentioned previously, different instances of the above-described path selection process can be performed by different MPIO drivers in different host devices.

Another example of an efficient load balancing process implemented utilizing an MPIO layer such as MPIO layer 332 of the FIG. 3 embodiment will now be described in more detail. Such a process utilizes path selection logic of one or more host devices to control path selection in conjunction with the provision of efficient load balancing of copy commands directed to storage arrays arranged in an active-active configuration. In this embodiment, it is assumed that the copy commands more particularly comprise XCOPY commands, although as indicated previously other types of copy commands can be used.

The active-active configuration in this embodiment may more particularly comprise a Symmetrix® Remote Data Facility (SRDF)/metro configuration, which facilitates replication of data from one Symmetrix® storage array to another through a SAN or an IP network, although a wide variety of other active-active configurations involving different types of storage arrays can be used.

In such a configuration, logical devices may be non-SRDF/local devices or SRDF/metro devices. A non-SRDF/local device is local to the first storage array and has no paired logical device on the second storage array, while an SRDF/metro device has a paired logical device in the second storage array. For example, consider a logical device R1 on the first storage array and a logical device R2 on the second storage array. With the SRDF/metro configuration, R1 can be paired with R2 such that R2 takes on the identity of R1 and is read/write accessible to the host device. The MPIO driver creates a single logical device for the paired devices R1 and R2 on the respective first and second storage arrays, thereby providing the host device with visibility into both the first and second storage arrays.

An XCOPY command may be used in this scenario, for example, in order to migrate a designated non-SRDF/local device to a designated SRDF/metro device in order to provide high availability for the migrated device. Absent use of the efficient load balancing techniques disclosed herein, the MPIO driver selecting a path for delivery of the XCOPY command will consider all possible paths to both the first and the second storage arrays. However, XCOPY command processing typically requires that both the source and target logical devices to be in the same storage device "inventory" of the particular storage array receiving the XCOPY command from the host device. Such an inventory is typically contained in a storage object or other data structure that the MPIO driver maintains for the corresponding storage array. Accordingly, absent use of the techniques disclosed herein, XCOPY commands directed by the MPIO driver to R2 over paths to the second storage array would fail as R1 would not be in the storage device inventory of the second storage array.

Illustrative embodiments solve this problem by implementing efficient load balancing techniques that ensure that the XCOPY command is directed over a path selected from those paths that are identified as shared paths between the source and target logical devices, such that both the source and target logical devices are in the storage device inventory of the particular storage array that receives the XCOPY command.

The process in the present example comprises an algorithm performed by an MPIO driver of a host device and includes the following steps:

1. An XCOPY command is obtained by the MPIO driver. The XCOPY command is illustratively generated as at least a portion of an IO operation by an application process running on a host processor of the host device. For example, the XCOPY command may be generated by a migration process running on the host device. The XCOPY command is configured to copy data of a source logical device denoted as DEV_X.

2. The MPIO driver decodes at least a portion of a command payload of the XCOPY command, illustratively including one or more copy source and copy destination (CSCD) descriptors of the command payload, to identify from designator information thereof a target logical device denoted as DEV_Y.

3. The MPIO driver identifies shared paths of the source and destination logical devices DEV_X and DEV_Y. This illustratively involves identifying a shared object denoting a plurality of paths shared by DEV_X and DEV_Y. For example, the MPIO driver may generate for each of first and second storage arrays a corresponding storage array object denoted STG_SYS1 or STG_SYS2. These storage array objects are examples of what are more generally referred to herein as respective "data structures," and each includes information identifying a set of paths to its corresponding storage array. As noted above, the storage arrays are illustratively in what is generally referred to herein as an active-active configuration. This can include, for example, the above-noted SRDF/metro configuration, or another type of active-active configuration used to facilitate replication of data from one storage array to another through a SAN or an IP network. For such a configuration, the MPIO driver illustratively identifies multiple storage arrays as being associated with a given storage device, and the storage array object may therefore comprise a federated object that includes multiple distinct storage array objects such as STG_SYS1 and STG_SYS2. The MPIO driver compares the sets of paths characterized by the relevant storage array objects in order to identify the shared paths, for example, as an intersection of the sets of paths between multiple distinct ones of the objects. Other techniques can be used to identify shared paths in other embodiments.

4. The MPIO driver performs load balancing of the XCOPY command using the identified shared paths of DEV_X and DEV_Y. For example, normal load balancing otherwise performed by the MPIO driver in its path selection is limited in the case of the XCOPY command to consider only those paths that are shared paths of DEV_X and DEV_Y.

Other types of copy commands having descriptors referencing source and destination logical devices by their respective device identifiers can be similarly load balanced using the techniques disclosed herein, for example, by identifying their shared paths and limiting the load balancing algorithm to consider only those shared paths when selecting a path for the copy command.

It should be noted that illustrative embodiments are not limited to use of device identifiers alone in identifying shared paths between source and target logical devices. For example, other embodiments can use additional or alternative information from a copy command payload in the shared path determination.

A similar process is assumed to be performed by any other MPIO drivers on any respective other host devices.

Some embodiments include only a single host devices, although multiple host devices are used in illustrative embodiments. For example, a single host device can be connected to two storage arrays that are arranged in an active-active configuration.

Also, it should be noted that the host devices in a given embodiment need not be in an active-active configuration. For example, multiple host devices can be arranged in a cluster and the host devices can be arranged in active-passive configurations, active-active configurations, or combinations thereof.

The particular efficient load balancing arrangements described above are presented by way of illustrative example only. Numerous alternative arrangements of these and other features can be used in implementing efficient load balancing in other embodiments.

The illustrative embodiments disclosed herein can provide a number of significant advantages relative to conventional arrangements. For example, some embodiments configure a multi-path layer of one or more host devices to include efficient load balancing functionality for paths utilized to communicate with multiple storage systems, such as first and second storage systems arranged in an active-active configuration.

Some embodiments are advantageously configured to provide particularly efficient load balancing of XCOPY commands and other types of copy commands.

For example, the load balancing provided by an MPIO driver in some embodiments substantially reduces the likelihood that one or more such copy commands will be rejected by one storage system arranged in an active-active configuration with another storage system, thereby avoiding copy command failures and their associated drawbacks, such as undue consumption of host CPU cycles and/or excessive numbers of copy command retries.

Illustrative embodiments can therefore make copy command handling within multi-pathing software such as that of PowerPath® more efficient and avoid any delays that might otherwise be introduced.

As a result, improved performance in processing of IO operations is achieved in illustrative embodiments.

Moreover, data replication across multiple storage arrays arranged in an active-active configuration is facilitated, thereby providing more efficient protection against failures. The disclosed functionality can be implemented using a wide variety of different storage arrays and other types of storage systems.

These and other arrangements are advantageously configured to provide efficient load balancing even in the presence of substantial path changes such as those that may result when paths are added or deleted as a result of zoning and masking changes or other types of storage system reconfigurations performed by a storage administrator or other user.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic and additional or alternative components. Also, the particular configurations of system and device elements and associated processing operations illustratively shown in the drawings can be varied in other embodiments. For example, a wide variety of different MPIO driver configurations and associated efficient load balancing arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device configured to communicate over a network with first and second storage systems;
the host device comprising:
a multi-path input-output driver configured to control delivery of input-output operations from the host device to the first and second storage systems over selected paths through the network;
wherein the multi-path input-output driver is further configured;
to obtain a copy command associated with at least one of the input-output operations;
to identify a plurality of paths that are shared between source and destination logical storage devices of the copy command;
to select a particular path from the identified paths; and
to send the copy command to one of the first and second storage systems over the selected path;
wherein identifying the plurality of paths that are shared between the source and the destination logical storage devices comprises:
accessing a first data structure of the host device, the first data structure corresponding to the source logical storage device and specifying a first set of paths;
accessing a second data structure of the host device, the second data structure corresponding to the destination logical storage device and specifying a second set of paths; and
identifying the plurality of paths utilizing path information obtained from the first and second data structures, wherein identifying the plurality of paths utilizing the path information obtained from the first and second data structures comprises identifying the plurality of paths as an intersection of the first and second sets of paths.

2. The apparatus of claim 1, wherein the first and second storage systems are arranged in an active-active configuration relative to one another.

3. The apparatus of claim 2, wherein a given one of the source and destination logical storage devices comprises a paired logical device established in accordance with the active-active configuration of the first and second storage systems, the paired logical device being identified by the multi-path input-output driver as a single logical device but having separate corresponding logical devices on the respective first and second storage systems.

4. The apparatus of claim 1, wherein the paths are associated with respective initiator-target pairs with the initiators being implemented on the host device and the targets being implemented on the first and second storage systems.

5. The apparatus of claim 4, wherein the initiators of the initiator-target pairs comprise respective host bus adaptors of the host device and the targets of the initiator-target pairs comprise respective storage array ports of the first and second storage systems.

6. The apparatus of claim 1, wherein identifying the plurality of paths that are shared between the source and the destination logical storage devices further comprises:
determining at least respective identifiers of the source and the destination logical storage devices of the copy command;
wherein accessing the first data structure of the host device is based at least in part on the identifier of the source logical storage device; and
wherein accessing the second data structure of the host device is based at least in part on the identifier of the destination logical storage device.

7. The apparatus of claim 1, wherein the first data structure comprises a first object specifying the first set of paths, the first set of paths being between the host device and at least one of the first and second storage systems, and the second data structure comprises a second object specifying the second set of paths, the second set of paths being between the host device and at least one of the first and second storage systems.

8. The apparatus of claim 7, wherein at least one of the first object and the second object comprises a federated object that specifies paths to both the first and the second storage systems for a paired logical device that is identified by the multi-path input-output driver as a single logical device but has separate corresponding logical devices on the respective first and second storage systems.

9. The apparatus of claim 1, wherein the copy command comprises a Small Computer System Interface (SCSI) command of a particular type.

10. The apparatus of claim 1, wherein the copy command comprises an extended copy command.

11. The apparatus of claim 1, wherein the copy command comprises a command payload, the command payload comprising a plurality of descriptors, including at least a first descriptor identifying the source logical storage device and a second descriptor identifying the destination logical storage device.

12. The apparatus of claim 1, wherein operation of a load balancing algorithm of the multi-path input-output driver is modified based at least in part on the identified paths that are shared between the source and the destination logical storage devices.

13. The apparatus of claim 1, wherein selecting a particular path from the identified paths that are shared between the source and the destination logical storage devices comprises limiting a load balancing algorithm of the multi-path input-output driver to consideration of only the identified paths that are shared between the source and the destination logical storage devices in selecting the particular path for sending the copy command to one of the first and second storage systems.

14. A method comprising:
configuring a multi-path input-output driver of a host device to control delivery of input-output operations from the host device to first and second storage systems over selected paths through a network;
the multi-path input-output driver:
obtaining a copy command associated with at least one of the input-output operations;
identifying a plurality of paths that are shared between source and destination logical storage devices of the copy command;
selecting a particular path from the identified paths; and
sending the copy command to one of the first and second storage systems over the selected path;
wherein identifying the plurality of paths that are shared between the source and the destination logical storage devices comprises:
accessing a first data structure of the host device, the first data structure corresponding to the source logical storage device and specifying a first set of paths;
accessing a second data structure of the host device, the second data structure corresponding to the destination logical storage device and specifying a second set of paths; and
identifying the plurality of paths utilizing path information obtained from the first and second data structures, wherein identifying the plurality of paths utilizing the path information obtained from the first and second data structures comprises identifying the plurality of paths as an intersection of the first and second sets of paths.

15. The method of claim 14, wherein the first and second storage systems are arranged in an active-active configuration relative to one another.

16. The method of claim 14, wherein identifying the plurality of paths that are shared between the source and the destination logical storage devices further comprises:
determining at least respective identifiers of the source and the destination logical storage devices of the copy command;
wherein accessing the first data structure of the host device is based at least in part on the identifier of the source logical storage device; and
wherein accessing the second data structure of the host device is based at least in part on the identifier of the destination logical storage device.

17. A computer program product comprising a non-transitory processor-readable storage medium having stored therein program code of one or more software programs, wherein the program code, when executed by a host device comprising a multi-path input-output driver, the multi-path input-output driver being configured to control delivery of input-output operations from the host device to first and second storage systems over selected paths through a network, causes the multi-path input-output driver:
to obtain a copy command associated with at least one of the input-output operations;
to identify a plurality of paths that are shared between source and destination logical storage devices of the copy command;
to select a particular path from the identified paths; and
to send the copy command to one of the first and second storage systems over the selected path;
wherein identifying the plurality of paths that are shared between the source and the destination logical storage devices comprises:
accessing a first data structure of the host device, the first data structure corresponding to the source logical storage device and specifying a first set of paths;
accessing a second data structure of the host device, the second data structure corresponding to the destination logical storage device and specifying a second set of paths; and
identifying the plurality of paths utilizing path information obtained from the first and second data structures, wherein identifying the plurality of paths utilizing the path information obtained from the first and second data structures comprises identifying the plurality of paths as an intersection of the first and second sets of paths.

18. The computer program product of claim 17, wherein the first and second storage systems are arranged in an active-active configuration relative to one another.

19. The computer program product of claim 17, wherein identifying the plurality of paths that are shared between the source and the destination logical storage devices further comprises:
determining respective identifiers of the source and the destination logical storage devices of the copy command;
wherein accessing the first data structure of the host device is based at least in part on the identifier of the source logical storage device; and
wherein accessing the second data structure of the host device is based at least in part on the identifier of the destination logical storage device.

20. The computer program product of claim 17, wherein the first data structure comprises a first object specifying the first set of paths, the first set of paths being between the host device and at least one of the first and second storage systems, and the second data structure comprises a second object specifying the second set of paths, the second set of paths being between the host device and at least one of the first and second storage systems.

* * * * *